United States Patent
Higgins et al.

(10) Patent No.: US 6,412,870 B1
(45) Date of Patent: Jul. 2, 2002

(54) SEATING UNIT FOR A PASSENGER VEHICLE

(75) Inventors: John Robert Higgins, Wokingham; Simon Lunn; Benedict Nicholas Samuels, both of London, all of (GB)

(73) Assignee: Britax Rumbold Limited, Warwick (GB)

( * ) Notice: Subject to any disclaimer, the term of this patent is extended or adjusted under 35 U.S.C. 154(b) by 0 days.

(21) Appl. No.: 09/630,424

(22) Filed: Aug. 1, 2000

(30) Foreign Application Priority Data

Aug. 4, 1999 (GB) .............................................. 9918263

(51) Int. Cl.⁷ ................................................ B60N 2/00
(52) U.S. Cl. ...................... 297/342; 297/354.13; 297/84
(58) Field of Search ............................ 297/354.13, 317, 297/318, 320, 342, 341, 84, 184.1

(56) References Cited

U.S. PATENT DOCUMENTS

| | | | |
|---|---|---|---|
| 2,098,623 A | * 11/1937 | Hard | |
| 2,629,425 A | 2/1953 | James | 155/6 |
| 2,917,105 A | * 12/1959 | De Vries et al. | |
| 3,086,814 A | * 4/1963 | Fletcher | |
| 4,492,407 A | * 1/1985 | Broadhead | |
| 4,563,784 A | * 1/1986 | Shrock et al. | |
| 4,756,034 A | 7/1988 | Stewart | 5/37 Z |
| 5,271,109 A | 12/1993 | Markel et al. | 5/37.1 |
| 5,722,726 A | * 3/1998 | Matsumiya | |

FOREIGN PATENT DOCUMENTS

| | | |
|---|---|---|
| EP | 0 869 061 A2 | 10/1998 |
| GB | 2 331 237 | 5/1999 |

* cited by examiner

*Primary Examiner*—Milton Nelson, Jr.
(74) *Attorney, Agent, or Firm*—Davis & Bujold, P.L.L.C.

(57) ABSTRACT

A seating unit for a passenger vehicle, especially an aircraft, has a reclinable seat back connected to a seating portion by a hinge. A slider is mounted in a guide track and supports the hinge. A pivotally connected front strut supports the seating portion at a location in front of the hinge. A pivotally connected rear strut supports the seat back at a location spaced apart from the hinge. As the slider along the guide track, the seat back moves to an orientation substantially coplanar with the seating portion so as to provide a flat surface for a sleeping passenger.

20 Claims, 8 Drawing Sheets

SEATING UNIT FOR A PASSENGER VEHICLE

FIELD

This invention relates to a seating unit for a passenger vehicle, especially an aircraft, comprising a seat having a base, a reclinable seat back, a seating portion, a hinge pivotally connecting the rear edge of the seating portion to the bottom edge of the seat back, and mounting means for supporting the seat back and seating portion on the base so that the seating portion moves forward as the seat back reclines.

RELATED ART

Seating units of this type are disclosed in GB-A-2331237 and EP-A-0869061. The seating portion moves forward with the reclining of the seat back so as to cooperate to form a substantially flat surface when the seat back is reclined in a substantially horizontal position.

SUMMARY OF THE INVENTION

According to the invention, in a seating unit of the type described above, the mounting means comprises a guide track mounted on the base, a slider mounted in the guide track and supporting the hinge between the seat back and the seating portion, a front strut pivotally connected at an upper end to a front portion of the base and pivotally connected at a lower end to the seating portion at a location in front of the hinge and a rear strut pivotally at one end to a rear portion of the base and pivotally connected at the other end to the seat back at a location spaced apart from the hinge, and drive means operative to cause movement of the slider along the guide track.

DETAILED DESCRIPTION OF THE PREFERRED EMBODIMENT

Figure 1:
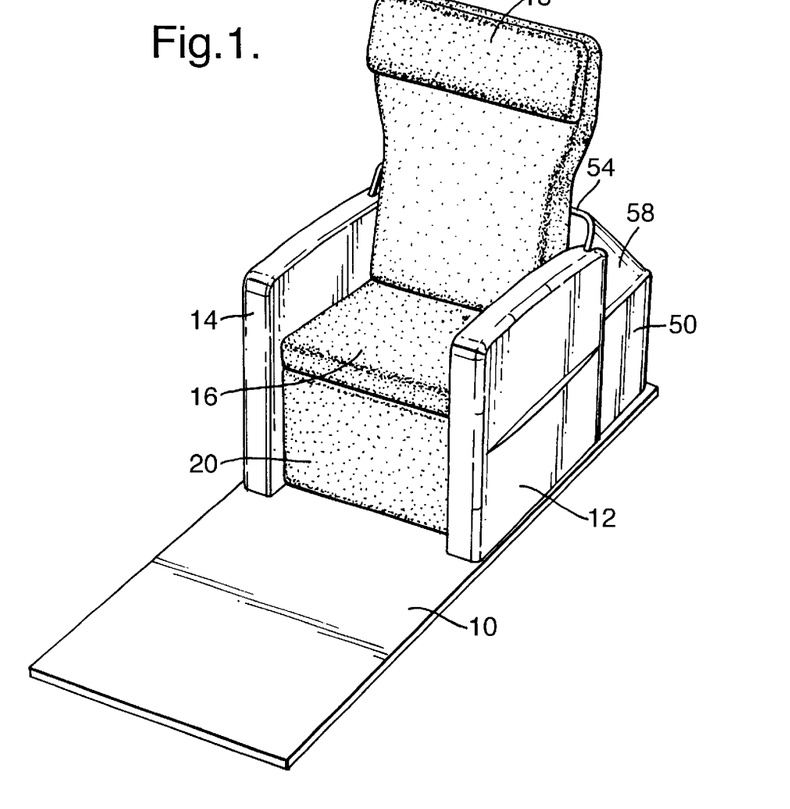
FIG. 1 is a perspective view of a first passenger seating unit for an aircraft cabin in its fully upright position.
Figure 2:
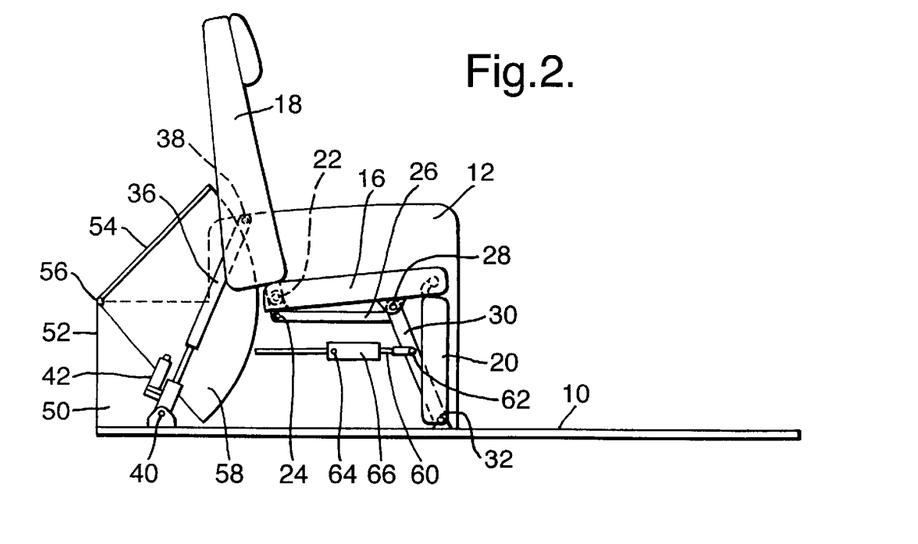
FIG. 2 is a schematic side view of the seating unit shown in FIG. 1.

Referring to FIGS. 1 and 2, a seating unit for use in the passenger cabin of an aircraft comprises a base unit 10 incorporating two fixed armrest units 12 and 14. The seating unit also has a seating portion 16, a seat back 18 and a leg rest 20. The bottom of the seat back 18 is connected to the rear of the seating portion 16 by a hinge 22 each end of which is mounted on a respective slider 24, one of which engages in a guide track 26 mounted on the inside surface of the armrest unit 12, and the other engages in a corresponding guide track (not shown) on the inside surface of the other armrest 14.

The front end of the seating portion 16 is connected by a pivot pin 28 to one end of a front strut 30 of fixed length. The other end of the front strut 30 is connected by a pivot pin 32 to the base unit 10. The leg rest 20 is pivotally mounted on the front edge of the seating portion 16 by a conventional mechanism 34 (see FIGS. 5 and 7) which will not be described in detail.

A telescopic rear strut 36 has its upper end connected by a pivot pin 38 to the seat back 18 at a location spaced from the hinge 22. The lower end of the rear strut 36 is connected by a pivot pin 40 to the base unit 10. The rear strut 36 includes an electrically powered drive unit 42 which can be actuated to vary its length. In FIGS. 1 and 2, when the seat back 18 is in its fully upright position, the rear strut 36 is at maximum length.

A static screen has side walls 50 extending rearwardly from the behind the armrest units 12 and 14 respectively, with their rear ends interconnected by an end wall 52. A movable screen 54 has its bottom rear edge connected to the top edge of the end wall 52 by a hinge 56. Quadrant-shaped side screens 58 are attached to the side edges of the movable screen 54. When the seat back is in its upright position shown in FIGS. 1 and 2, the upper edge of the movable screen 54 is in close proximity to the rear surface of the seat back 18.

A second (rear) telescopic strut 60 has its front end connected by a pivot pin 62 to the front strut 30 at a location spaced from the pivot pin 32. The rear end of the second telescopic strut 60 is connected by a pivot axle 64 which extends between the armrest units 12 and 14. The second telescopic strut 60 includes an electrically powered drive unit 66 which can be actuated to vary its length. In FIGS. 1 and 2, the second telescopic strut 60 is at minimum length.

Figure 3:
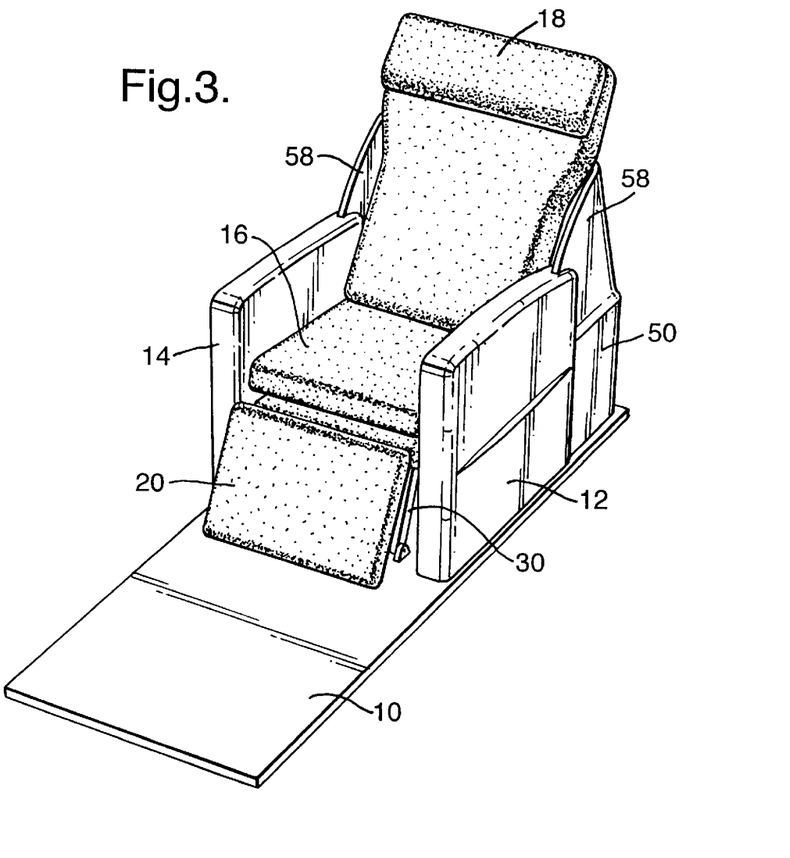
FIGS. 3 and 4 are views corresponding to FIGS. 1 and 2 but showing the first seating unit in a partly reclined position.
Figure 4:
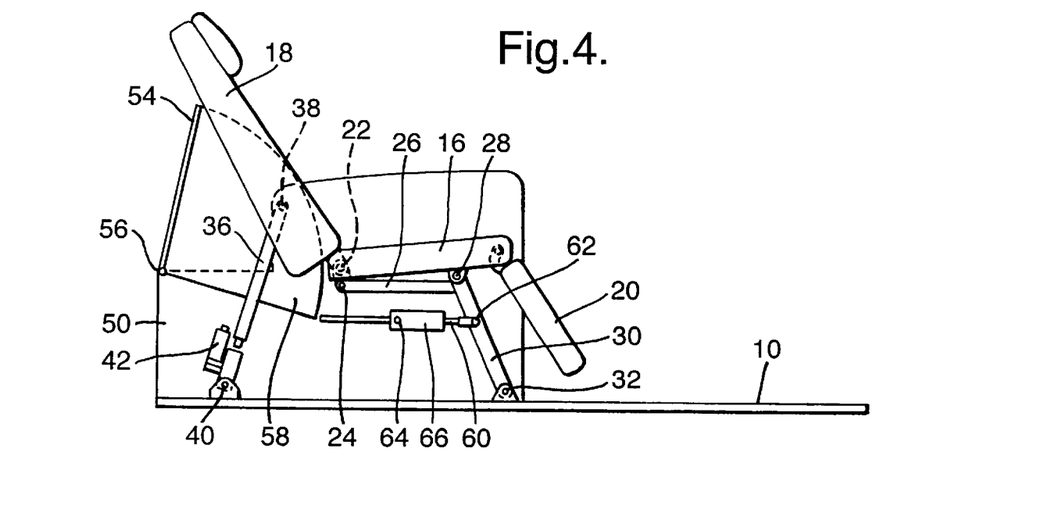

When the seat back 18 is to be reclined, the drive unit 42 is actuated to shorten the telescopic rear strut 36 to its minimum length as shown in FIGS. 3 and 4. The movable screen 54 rides up the back surface of the seat back 18. The seating portion 16 remains substantially in its original position. At the same time, the mechanism 34 may be arranged to start to move the leg rest 20 upwardly.

Figure 5:
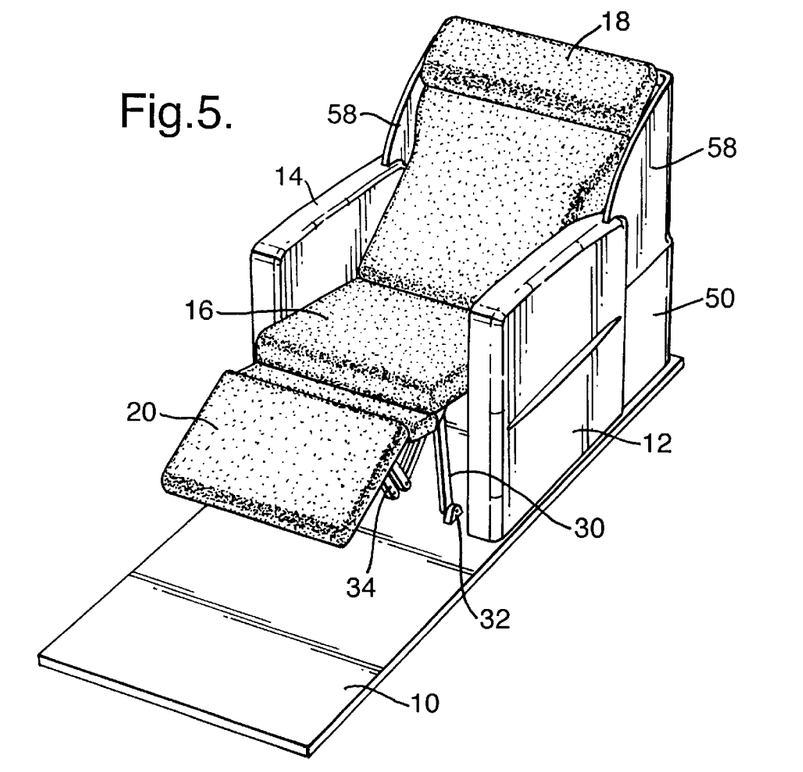
FIGS. 5 and 6 are views corresponding to FIGS. 1 and 2 but showing the first seating unit in a further reclined position.
Figure 6:
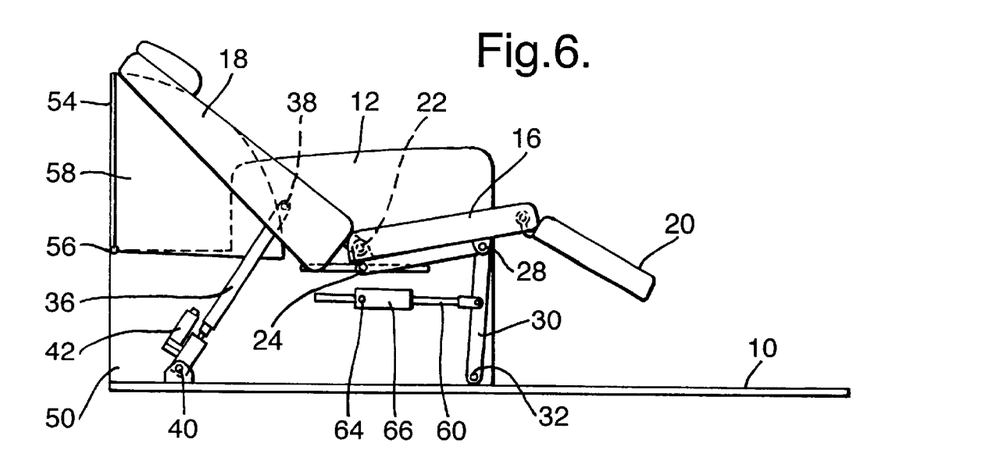

Next, the drive unit 66 is actuated to lengthen the second telescopic strut 60, thereby causing the sliders 24 to start to move along the tracks 26 as illustrated in FIGS. 5 and 6. The resulting forward movement of the seating portion 16 causes the front strut 30 to pass through its vertical position. The movable screen 54 reaches a vertical position with upper edge level with the top of the seat back 18.

Figures 7, 8:
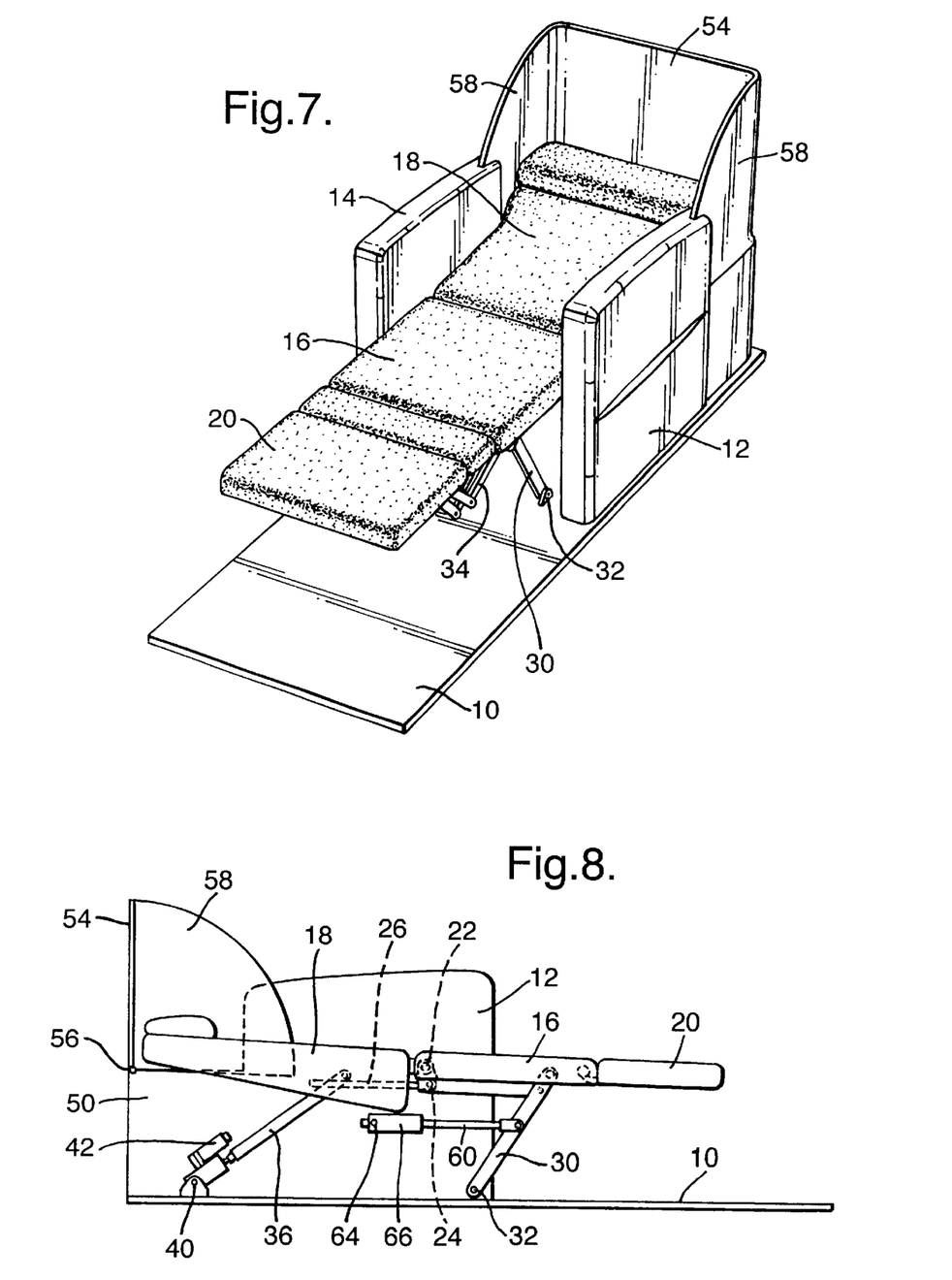
FIGS. 7 and 8 are views corresponding to FIGS. 1 and 2 but showing the first seating unit in its fully reclined position.

When the second telescopic strut 60 reaches its maximum length, the seating portion 16 is in its fully forward position, as shown in FIGS. 7 and 8. This forward position moves the seating portion 16 forward and causes the seat back 18 to move to a substantially horizontal position. The resulting continued clockwise movement of the front strut 30 lowers the front edge of the seating portion 16 so that it forms a substantially flat surface with the seat back 18. The leg rest 20 is also moved to a substantially horizontal position so as to form a continuation of this flat surface. The sliders 24 are now at the front end of the track 26. The movable screen 54 remains vertical and, together with the side screens 58, shields the head area of the seat back 18.

The seating unit can be restored to its upright position by reversing the direction of operation of the drive units 42 and 60. It will be noticed that, even when the seating unit is in its upright position, the movable screen 54 is at an angle of at least 44° to the horizontal. This discourages the placing of movable articles on the screen 54 and thus avoids any hazard from such articles being tipped on to the feet of a passenger occupying a seat behind the seating unit illustrated.

In the drawings, the base unit 10 is shown as comprising a flat floor panel. This may be replaced by a frame connecting the armrest units 12 and 14, and the pivot pins 32 and 40 to the floor of the aircraft cabin.

Figure 9:
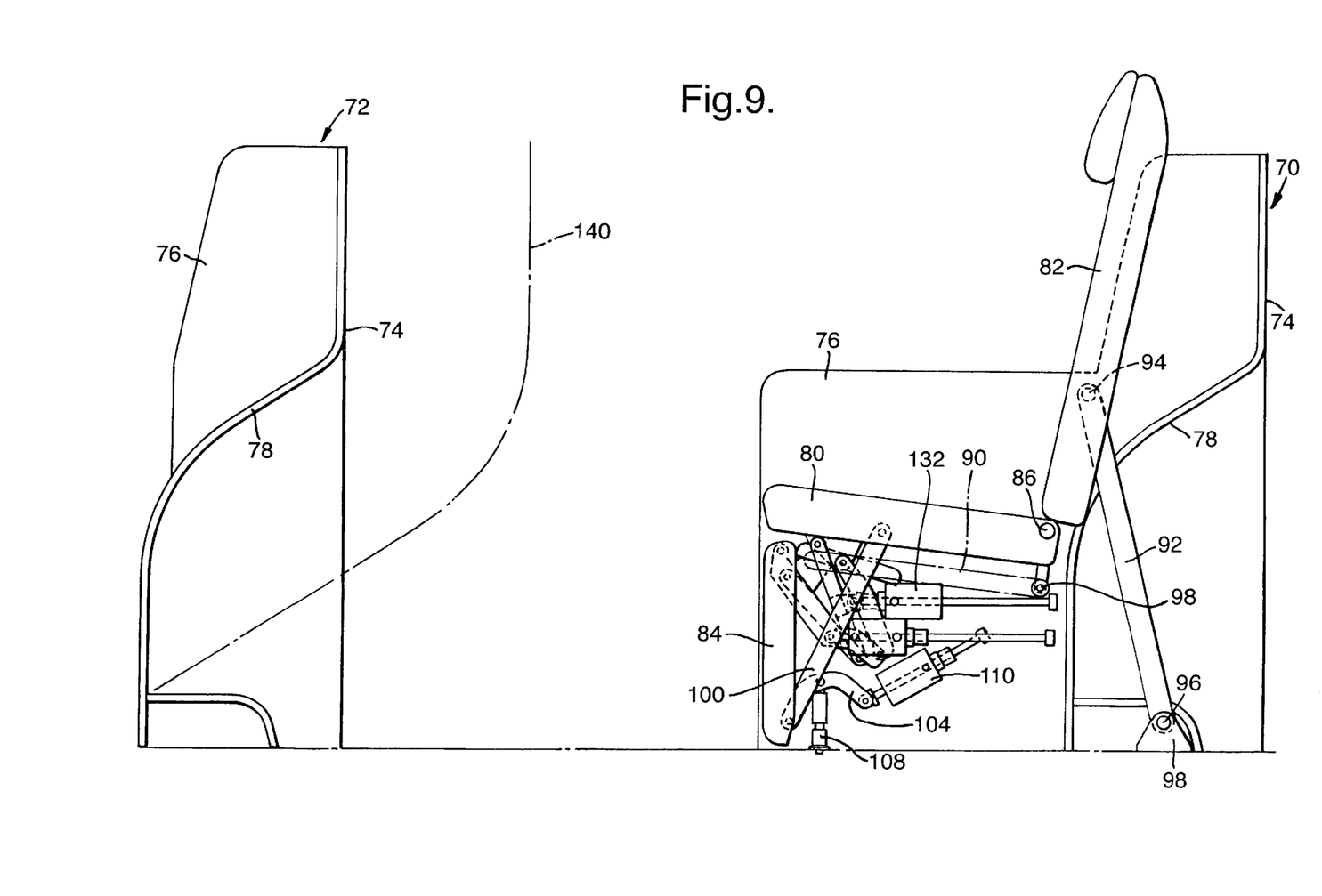
FIG. 9 is a schematic longitudinal sectional view of a second passenger seating unit for an aircraft cabin in its fully upright position.
Figure 10:
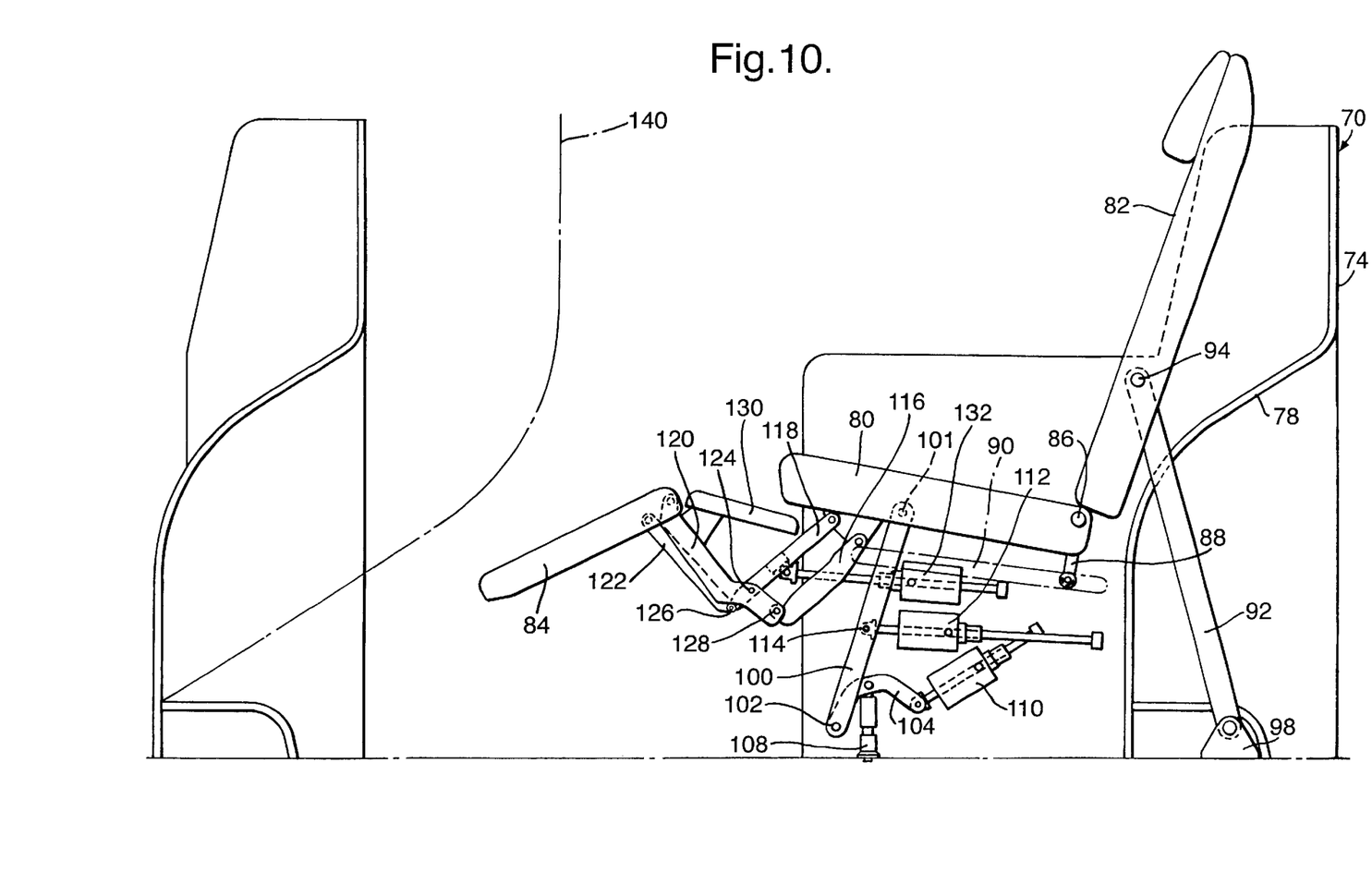
FIG. 10 is a view corresponding to FIG. 9 but showing the second seating unit in a partly reclined position.

FIGS. 9 to 12 show another seating unit 70 in accordance with the invention, together with the rear part of a seating unit 72 positioned in front of the seating unit 70. Some detail has been omitted from FIG. 9 for the sake of clarity. Corresponding parts of the seating units 70 and 72 are denoted by the same reference numerals and will not be described in detail. As can be seen in FIGS. 9 and 10, each seating unit comprises a static portion having a back panel 74 and two side panels 76 (only one of which is visible in the drawings incorporating arm rests). Each back panel 74 has a recessed portion 78 for accommodating the lower legs and feet of the passenger occupying the seat behind.

The seating unit also has a seat portion 80, a back rest 82 and a leg rest 84. The bottom of the back rest 82 is connected to the rear of the seat portion 80 by a hinge 86 which has its ends secured to respective sliders 88 engaging in guide tracks 90 on the inside surface of each of the side panels 76. A fixed-length rear strut 92 has one end pivotally connected by a pivot pin 94 to the back rest 82 at a location spaced from the hinge 86. The lower end of the strut 92 is connected by a pivot pin 96 to a rear transverse member 98 extending between the side panels 76.

A front support strut 100 has its upper end connected by a pivot pin 101 to a location on the seat portion 80 spaced forwardly from the hinge 86. The lower end of the strut 100 is connected by a pivot pin 102 to one end of an L-shaped lifter link 104 which is supported at its mid-point on a pivot pin 106. The pin 106 is mounted on a front transverse member 108 extending between the side panels 76. The other end of the lifter link 104 is connected to a first screw jack drive 110 mounted between the side panels 76. A second screw jack drive 112 is mounted between the side panels 76 and has its driven end connected by a pivot pin 114 to an intermediate location on the front support strut 100.

The rear transverse member 98 and the front transverse member 108, together with other structural elements (not shown, which may include the floor of the aircraft) form a base for the seat.

The leg rest 84 is connected to the seat portion 82 by a four-bar link mechanism comprising links 116 and 118 which are pivotally connected to the seat portion 80 and links 120 and 122 which are pivotally connected to the leg rest 84. The link 118 is connected by a first intermediate pivot pin 124 to the link 120 and by a second intermediate pivot pin 126 to the link 122. The link 120 is also connected by a third intermediate pivot pin 128 to the link 116. The link 120 has an infill panel 130 rigidly mounted thereon for a purpose to be explained hereinafter. A third screw jack drive 132 is mounted on the front support strut 110 and has its driven end connected by a pivot pin 134 to an intermediate point on the link 118.

When it is desired to move the seat from the upright position shown in FIG. 9 to an intermediate reclined position as shown in FIG. 10, the second screw jack drive 112 drives the front support strut 100 forwards so that the slider 88 starts to move along the guide track 90. If it is desired to deploy the leg rest 84 at the same time, the third screw jack drive 132 pushes the link 118 forwards.

Figure 11:
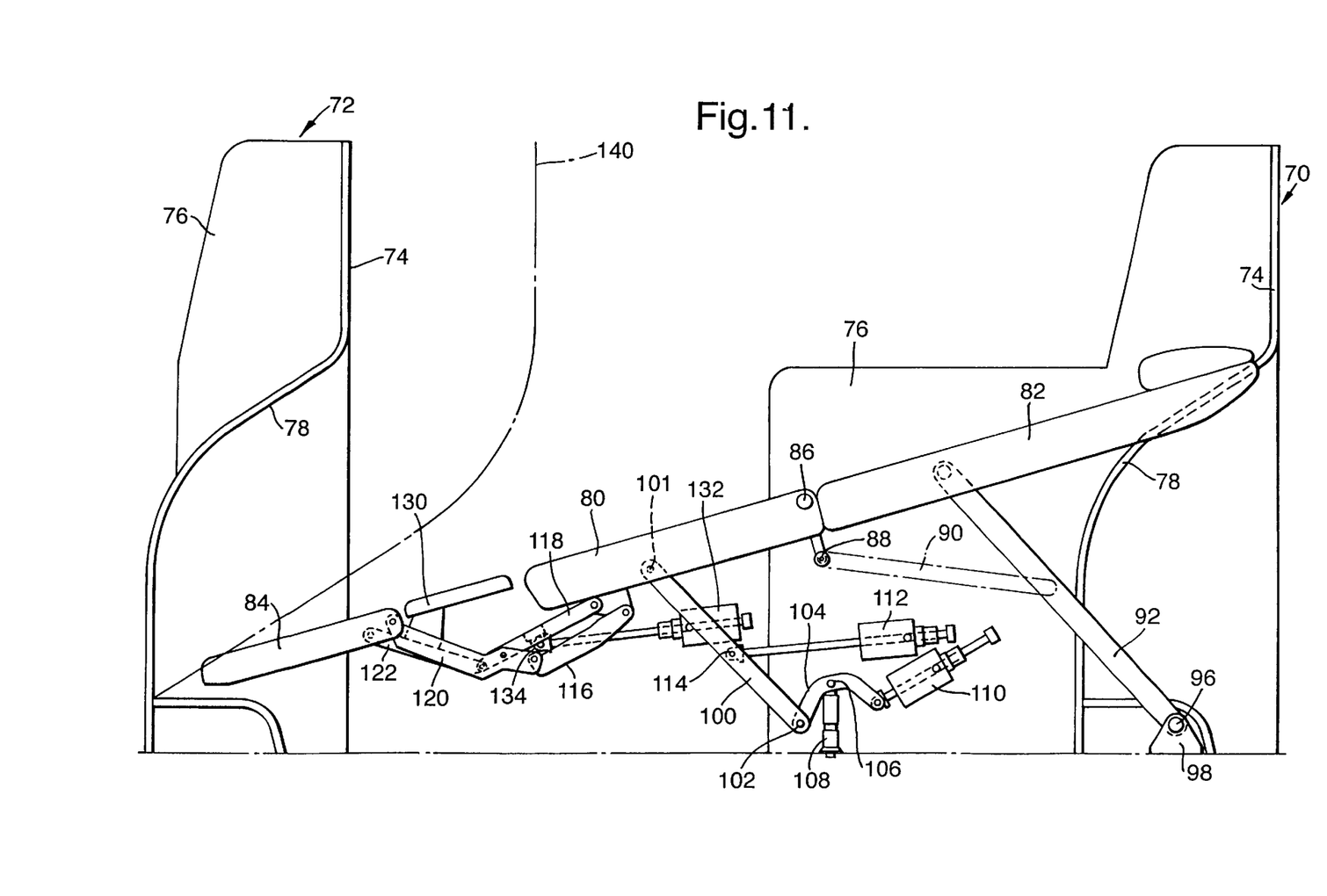
FIG. 11 is a view corresponding to FIG. 9 but showing the second seating unit in an angled flat-bed position.

As shown in FIG. 11, continued forward movement of the screw jack drives 112 and 132 moves the slider 88 to the front of the slide track 90 and pushes the leg rest 84 forward to a maximum extent. In this condition, the back rest 82, the seat portion 80 and the leg rest 84 are in line with one another and the infill panel 130 has swung up to fill the gap between the seat portion 80 and the leg rest 84. This provides a flat surface on which a seat occupant can sleep, albeit one which is inclined at about 16° to the cabin floor.

Figure 12:
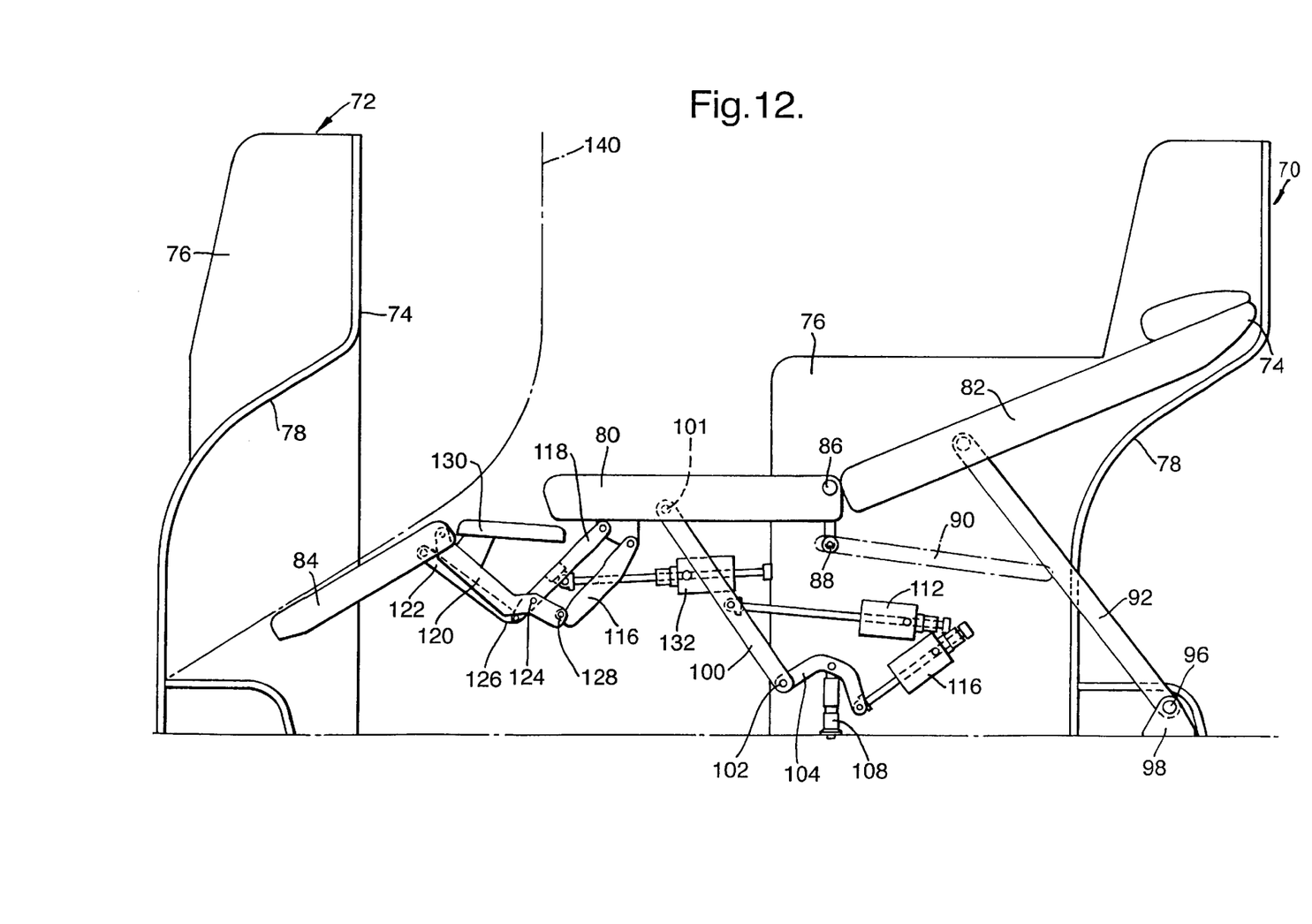
FIG. 12 is a view corresponding to FIG. 9 but showing the second seating unit in a "Z-bed" position.

Although the angle between the flat surface shown in FIG. 11 and the horizontal is only about 13° because aircraft commonly fly in a 3° nose-up attitude, some passengers may find this inclination uncomfortable. As an alternative, the first screw jack drive 110 may be actuated to drive the rear end of the lifter link 104 downwards so as to raise the front support strut 110 sufficiently for the top surface of the seat portion 80 to be parallel with the cabin floor, as shown in FIG. 12. At the same time, the screw jack drive 132 is retracted so that the leg rest 84 is approximately parallel to but no longer coplanar with the seat back 82.

It will be appreciated that, at all times, there is a minimum clearance between the various parts of the seat 70 and the back of the seat 72 in front as indicated by the chain-dotted line 140.

If the seat is not required to take up the position shown in FIG. 12, the lifter link 104 and its screw jack drive 132 may be omitted and the pivot joint 102 being secured at a fixed location relative to the transverse member 108. Similarly, if the position shown in FIG. 11 is not required, the pivot joint 102 may be secured at a fixed location chosen in relation to the length of the front strut 100 so that the seating portion is movable between the position shown in FIG. 9 and the position shown in FIG. 12.

The leg rest 20 of FIGS. 1 to 8 may be mounted on a mechanism of the type shown in FIGS. 9 to 12. Alternative mechanisms may be used for supporting the leg rest 84 provided that they keep it behind the line 140.

What is claimed is:

1. A seat unit for a passenger vehicle comprising:
    a base;
    a reclinable seat back;
    a seating portion;
    a hinge pivotally connecting a rear edge of the seating portion to a bottom edge of the seat back;
    a guide track having a front end and a rear end and the guide track is mounted on the base;
    a slider mounted in the guide track and supporting the hinge between the seat back and the seating portion;
    a front strut pivotally connected at a lower end to a front portion of the base and pivotally connected at an upper end to the seating portion at a location in front of the hinge;
    a rear strut pivotally connected at a first end to a rear portion of the base and pivotally connected at a second end to the seat back at a location spaced apart from the hinge; and
    a drive operative to cause movement of the slider along the guide track, whereby the seating portion moves forward as the seat back reclines.

2. The seat unit according to claim 1, further comprising a leg rest connected to the seating portion by a four-bar link mechanism, the four-bar link mechanism comprising a first, second, third, and fourth link, a first end of the first and second links are pivotally connected to the seat portion and a first end of the third and fourth links are pivotally connected to the leg rest, the first link being connected by a first intermediate pivot pin to the third link and by a second pivot pin to the fourth link, and the third link is also being connected by a third pivot pin to the second link.

3. The seat unit according to claim 2, wherein an infill panel is rigidly mounted on the first link.

4. The seat unit according to claim 1, wherein the rear strut is of a fixed length.

5. The seat unit according to claim 4, wherein the lower end of the front strut is connected to the front portion of the base at a location such that the seating portion is substantially horizontal when the slider is at the front end of the guide track.

6. The seat unit according to claim 4, wherein the lower end of the front strut is connected to said front portion of the base at a location such that the seating portion is substantially coplanar with the seat back when the slider is at the front end of the guide track.

7. The seat unit according to claim 4, further comprising an adjuster connecting the lower end of the front strut to the front portion of the base, the adjuster being adapted to move the lower end of the front strut between a first position in which the seating portion is substantially coplanar with the seat back when the slider is at the front end of the guide track and a second position in which the seating portion is substantially horizontal when the slider is at the front end of the guide track.

8. The seat unit according to claim 7, wherein the adjuster comprises a lever which is pivotally mounted on the base.

9. The seat unit according to claim 1, wherein the drive is operative to cause angular movement of the front strut.

10. The seat unit according to claim 9, wherein the front strut is of a fixed length.

11. The seat unit according to claim 9, wherein the rear strut is of a fixed length.

12. The seat unit according to claim 11, wherein the lower end of the front strut is connected to the front portion of the base at a location such that the seating portion is substantially horizontal when the slider is at the front end of the guide track.

13. The seat unit according to claim 11, wherein the lower end of the front strut is connected to the front portion of the base at a location such that the seating portion is substantially coplanar with the seat back when the slider is at the front end of the guide track.

14. The seat unit according to claim 11, further comprising an adjuster connecting the lower end of the front strut to the front portion of the base, the adjuster being adapted to move the lower end of the front strut between a first position in which the seating portion is substantially coplanar with the seat back when the slider is at the front end of the guide track and a second position in which the seating portion is substantially horizontal when the slider is at the front end of the guide track.

15. The seat unit according to claim 14, wherein the adjuster comprises a lever which is pivotally mounted on the base.

16. A seat unit for a passenger vehicle comprising:

a base;

a reclinable seat back;

a seating portion;

a hinge pivotally connecting the rear edge of the seating portion to the bottom edge of the seat back;

a guide track mounted on the base;

a slider mounted in the guide track and supporting the hinge between the seat back and the seating portion;

a front strut pivotally connected at a lower end to a front portion of the base and pivotally connected at an upper end to the seating portion at a location in front of the hinge;

a rear strut pivotally connected at a first end to a rear portion of the base and pivotally connected at a second end to the seat back at a location spaced apart from the hinge;

a first drive operative to cause movement of the slider along the guide track, whereby the seating portion moves forward as the seat back reclines, and a second drive operative to vary the length of the rear strut.

17. The seat unit according to claim 16, wherein the first drive is operative to cause angular movement of the front strut.

18. The seat unit according to claim 17, wherein the front strut is of a fixed length.

19. The seat unit according to claim 16, wherein the length of the front strut is such that the seating portion is substantially horizontal when the slider is at the front end of the guide track and the length of the rear strut is adjustable so that the seat back is then substantially coplanar with the seating portion.

20. The seat unit according to claim 19, further comprising a screen pivotally mounted for angular movement about a horizontal axis behind the seat back between a forward position in which the screen has an upper edge that abuts against a rear surface of the seat back when the seat back is in an upright position and when in a reclined position the screen projects above the substantially flat surface formed when the slider is at the front end of the guide track and the seat back is substantially coplanar with the seating portion.

* * * * *